United States Patent
Pratt

(10) Patent No.: US 7,159,776 B2
(45) Date of Patent: Jan. 9, 2007

(54) SYSTEM AND METHOD FOR OPTICAL MEDIUM LABEL ALIGNMENT

(75) Inventor: Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/029,602

(22) Filed: Jan. 5, 2005

(65) Prior Publication Data

US 2006/0144941 A1 Jul. 6, 2006

(51) Int. Cl.
*G06K 7/10* (2006.01)
(52) U.S. Cl. ..................................... 235/454
(58) Field of Classification Search ................. 235/454
See application file for complete search history.

(56) References Cited

U.S. PATENT DOCUMENTS

| | | | |
|---|---|---|---|
| 6,370,094 B1* | 4/2002 | Kishinami et al. | 369/44.32 |
| 6,768,705 B1* | 7/2004 | Hirai | 369/44.28 |
| 6,778,205 B1 | 8/2004 | Anderson et al. | 347/251 |
| 6,801,487 B1 | 10/2004 | Anderson | 369/47.12 |
| 6,846,541 B1 | 1/2005 | Oshima | 428/64.1 |
| 6,872,437 B1 | 3/2005 | Van Brocklin et al. | 428/64.1 |
| 2003/0007449 A1* | 1/2003 | Kim et al. | 369/290 |
| 2003/0108708 A1* | 6/2003 | Anderson et al. | 428/64.4 |
| 2004/0141385 A1* | 7/2004 | Pettigrew et al. | 365/200 |

* cited by examiner

*Primary Examiner*—Michael G. Lee
*Assistant Examiner*—Tae W. Kim
(74) *Attorney, Agent, or Firm*—Hamilton & Terrile, LLP; Robert W. Holland

(57) ABSTRACT

Multiple label writes to an optical medium label surface are aligned with each other by reference to a calibration band disposed on the label surface. On initial insertion of the optical medium into the optical drive, a label alignment module uses the optical head to detect the calibration band or, if no calibration band exists, to write a calibration band. The label alignment module analyzes the eccentricity error presented by the calibration band during rotation of the optical medium, such as the amplitude and phase of the error, and applies the error to the optical head to write label information in alignment with the calibration band.

21 Claims, 4 Drawing Sheets

SYSTEM AND METHOD FOR OPTICAL MEDIUM LABEL ALIGNMENT

BACKGROUND OF THE INVENTION

1. Field of the Invention

The present invention relates in general to the field of writing information to an optical medium, and more particularly to a system and method for optical medium label alignment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more common and have improved in the speed at which they process information, increasing amounts of information have been generated for storage. Optical media provide a sensible and relatively inexpensive solution for storing large quantities of information on a portable material. Generally, an optical medium stores information by altering the reflective qualities of a data layer material with a focused laser and allows retrieval of information by reflection of the focused laser against the altered material to measure the reflected light characteristics. Although optical media provide a convenient and portable storage solution, one difficulty faced by users of optical media is tracking the contents on any given optical medium without having to insert the medium in an information handling system to read the contents. To address this difficulty, optical media labeling solutions have emerged that write labels on the non-storage side of an optical medium. After a user writes information on the storage side of an optical medium, the user turns the optical medium over in the drive to write labels on the non-storage side, such as list of the contents. The labels are written with the optical drive's laser which interacts with chemicals on the non-storage side to make visible markings.

Information is often written to the same optical medium in separate write sessions. Each time the optical medium storage side is placed on an optical drive spindle, the center of rotation of the optical medium tends to shift so that a certain amount of eccentricity is associated with rotation of the optical medium. To adjust for this eccentricity, optical drive optical pick-up units sense and follow tracks or grooves stamped in the optical medium at manufacture. The same type of eccentricity problem exists if information is written in separate writes to the non-storage label side of an optical medium, however, the label side does not have tracks or grooves, which would disrupt the label appearance, so the optical pick-up unit is typically locked in a centered position or allowed to "float" to perform subsequent label writes. Thus, the concentric circles traced by the optical pick-up unit as the optical medium is spun by the optical drive have their radius centers randomly distributed by the interface between the optical medium and the drive spindle hub. Compact Discs (CDs) have a specified eccentricity of up to 70 micrometers so that two separate label writes may fall within the allowable standard and still have a misregistration due to misalignment of the optical medium of 140 micrometers. Where separate labels require precise alignment, especially where numerous separate label writes are performed, this eccentricity causes undesirable misalignment that detracts from the appearance of the label.

SUMMARY OF THE INVENTION

Therefore a need has arisen for a system and method which aligns multiple label writes with each other when made at separate occurrences to an optical medium.

In accordance with the present invention, a system and method are provided which substantially reduce the disadvantages and problems associated with previous methods and systems for writing labels to optical media. Label writes to an optical medium label surface are aligned with a reference mark so that separate label writes to the label surface will align with each other. Misalignment of an optical head with the reference mark is determined and corrected with a feed forward position control that maintains the optical head in substantial alignment with the reference mark as the optical medium rotates.

More specifically, a label alignment module analyzes movement of a calibration band reference mark on an optical medium relative to an optical head to determine the amplitude and phase of eccentricity error produced from misalignment of the optical medium with the optical head. The amplitude and phase eccentricity error are fed forward to a optical head position controller so that the optical head moves in alignment with the calibration band, allowing label writes from a laser on the optical head to align with the calibration band. The phase of the eccentricity error is determined by stepping the optical head towards the calibration band until the calibration band is first detected by the optical pickup unit of the optical head at the point in rotation at which the eccentricity error has the maximum amplitude. The magnitude is estimated by positioning the optical pickup unit on the calibration band at the detected phase and determining the amount of rotation during which the calibration band is detected. The estimated phase and amplitude error are iteratively applied as a feed forward correction to the optical head until the calibration band is detected during the entire rotation, and then the phase and amplitude error are applied as a feed forward correction to write label information to the label surface in alignment with the calibration band.

The present invention provides a number of important technical advantages. One example of an important technical advantage is that plural writes to an optical medium label surface are aligned to provide a uniform and consistent appearance of the label. Alignment of label writes is accomplished with available optical drive hardware so that the cost and complexity of implementing label writing alignment is reduced and retrofit of existing systems is available with firmware or software updates. Improved label writing quality is provided with minimal delay and user inconvenience for an enhanced information handling system user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Multiple writes of label information provided from an information handling system to an optical drive are aligned by reference to a calibration band on an optical medium. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
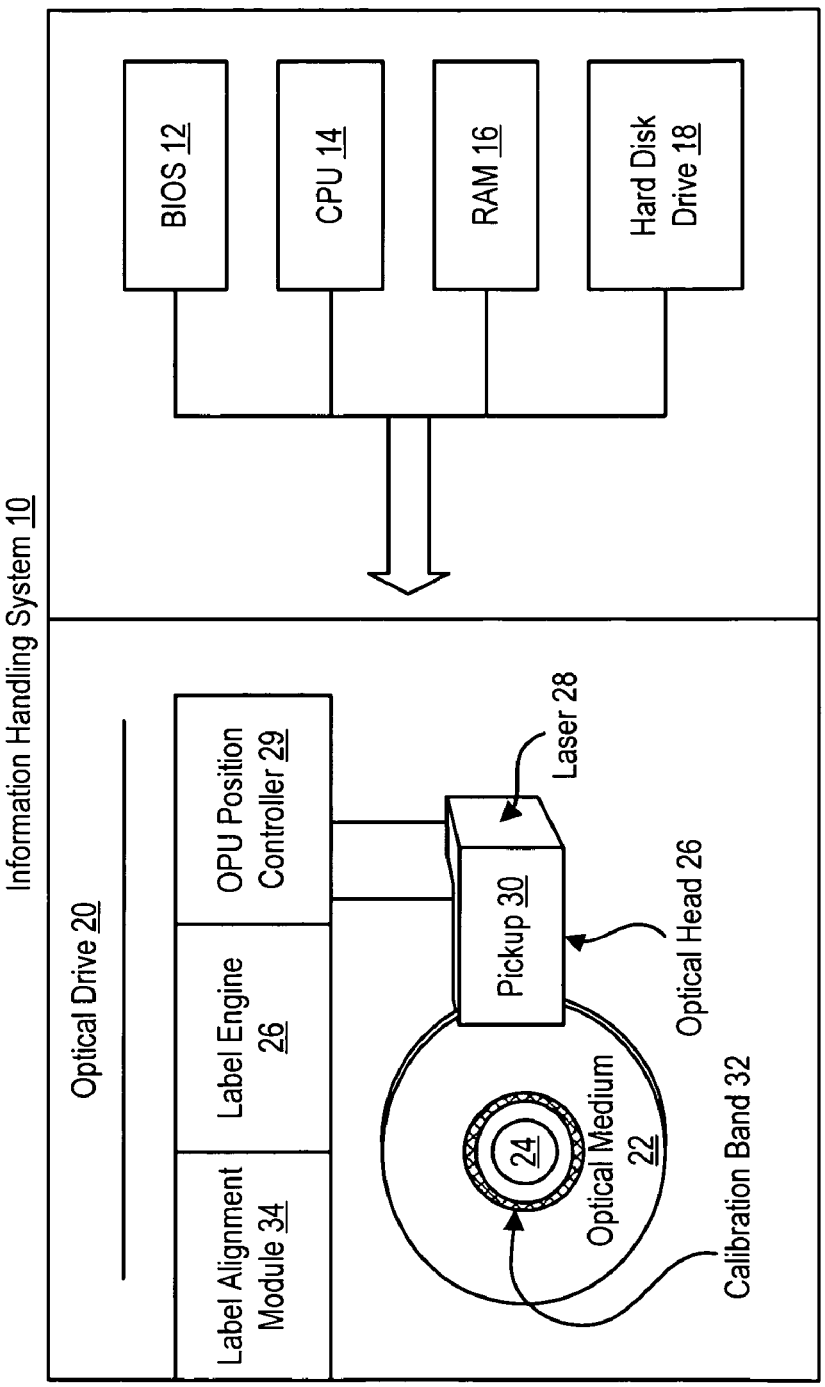
FIG. 1 depicts a block diagram of an information handling system having an optical drive that aligns multiple label writes.

Referring now to FIG. 1, a block diagram depicts an information handling system 10 having an optical drive that aligns multiple label writes to an optical medium. Processing components of information handling system 10, such as a BIOS 12, CPU 14, RAM 16 and hard disc drive 18, cooperate to generate label information to write a label to an optical medium and to communicate the label information to an optical drive 20. Optical drive 20 rotates an optical medium 22, such as a CD, DVD or high definition DVD disc, about a spindle 24 and proximate to an optical head 26. Optical head 26 has a laser 28 that illuminates optical medium 22 and an optical pickup unit 30 that receives illumination reflected from optical medium 22. In order to write information to optical medium 22, including stored information on a storage surface or label information on a label surface, laser 28 illuminates at higher power settings that alter the material on optical medium 22. Writes of label information to the label surface are performed by a label engine 26 which selectively illuminates laser 28 to alter a chemical coating on the label surface to have a visibly-readable effect defined by label information generated by the processing components.

Each time optical medium 22 is removed from optical drive 20 and subsequently replaced, the alignment of optical medium 22 relative to optical head 26 may change within predetermined standard tolerations. The misalignment of optical medium 22 relative to optical head 26 relates to the size and shape of the spindle opening of optical medium 22 as it fits over spindle 24. An optical pickup unit position controller 29 adjusts for this misalignment during writes to the storage side of optical medium 22 by following the tracks in which the information is written, however, label information written to the label side of optical medium 22 is written for visual effects that do not use tracks. In order to maintain the alignment of multiple separate label writes, a label alignment module 34 detects and analyzes the misalignment error by reading a calibration band 32. Calibration band 32 has a reflectivity detectable by optical pickup unit 30 and acts as a reference mark to which the multiple label writes are aligned. Calibration band 32 is located near the spindle opening to minimize the impact on label writes and has a width substantially equal to the greatest amount of expected misalignment error surrounded by an unwritten area of approximately the same width. Label alignment module 34 detects the eccentricity error of calibration band 32 relative to the neutral position of optical head 26 by observing the eccentricity as optical medium 22 rotates, and provides a correction signal to position controller 29 that aligns laser 28 relative to calibration band 32 during writes of label information to the label surface so that multiple separate laser writes appear aligned.

Figure 2:
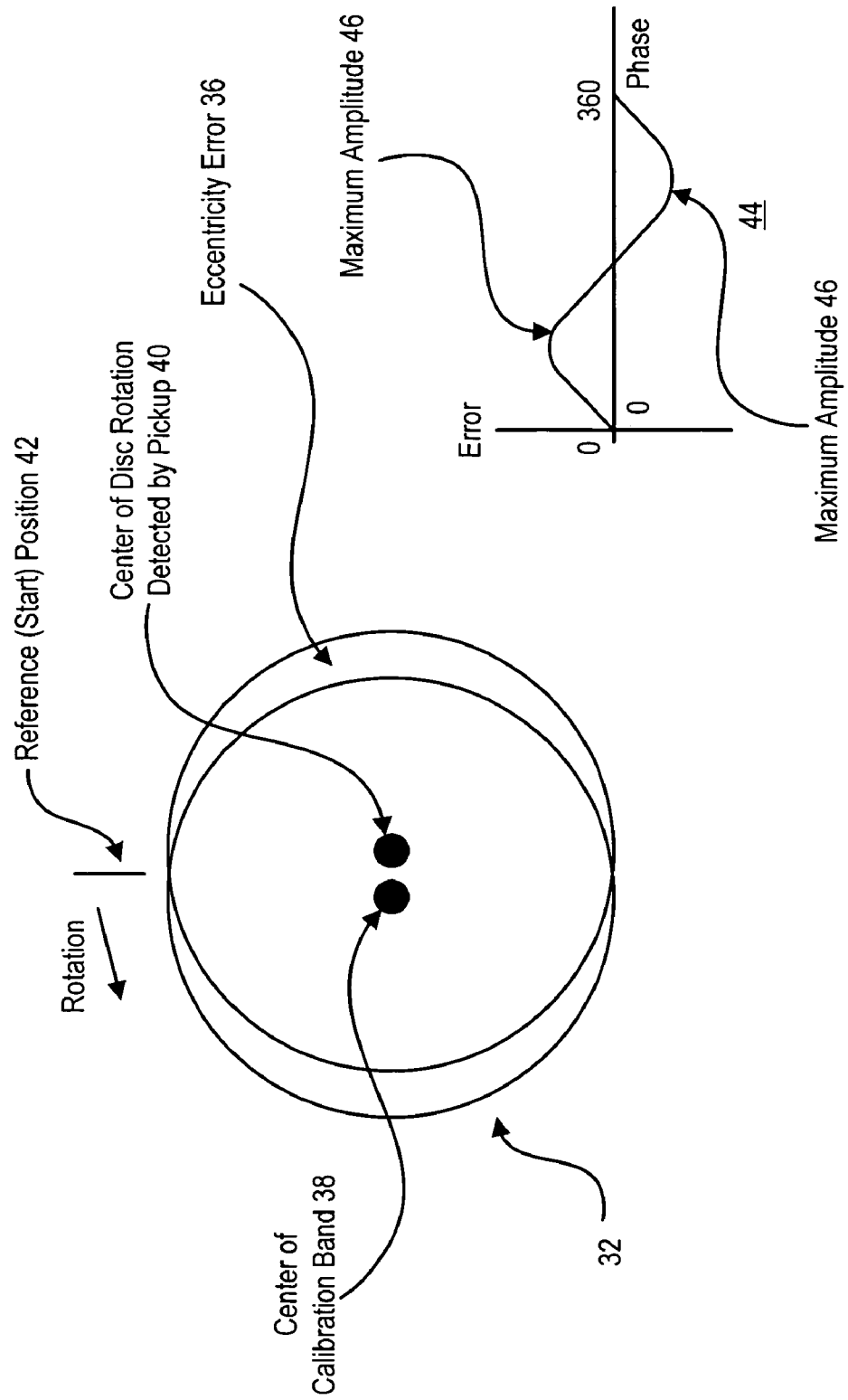
FIG. 2 depicts eccentricity error presented to an optical drive by a misaligned calibration band reference mark.
Figure 3:
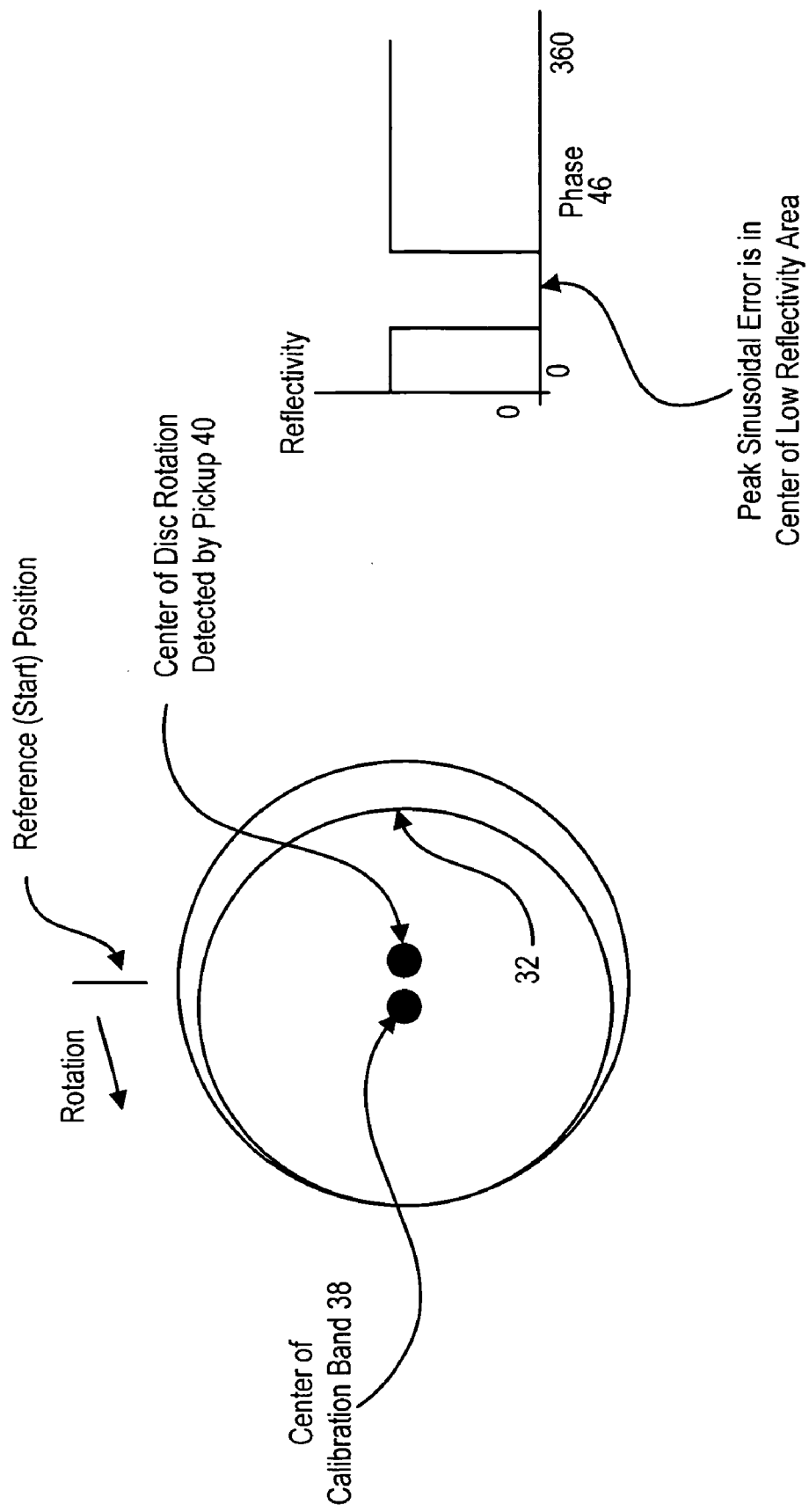
FIG. 3 depicts analysis of eccentricity error amplitude and phase by detection of the reference mark.

Referring now to FIGS. 2 and 3, an eccentricity error 36 associated with rotation of an optical medium with calibration band center point 38 is depicted as presented relative to the center of disc rotation point 40. From a starting reference point 42, which may be indicated by an appropriate mark on the optical medium, the eccentricity error follows a sinusoidal path in which the amplitude of the error changes in relation to the phase of the rotation of the optical medium. As is depicted by the graph 44 of FIG. 2, the error has a maximum amplitude 46 that occurs twice per each frequency of rotation. As is depicted by FIG. 3, the phase at which the eccentricity error maximum amplitude occurs is detected by stepping the optical pickup unit to view an increasingly small radius until the optical pickup unit first detects calibration band 32. Detection is made by detection of an increased or decreased reflectivity at the inner diameter of the optical medium by stepping in towards a position proximate the inner diameter or, alternatively, at the outer diameter by stepping in from the inner portion towards a position proximate the outer diameter. The graph 46 of FIG. 3 depicts that the reflectivity read from the optical medium drops at detection of the calibration band so that the phase of the sinusoidal eccentricity error is located at the center of the drop of the reflectivity. The exact phase and amplitude of the eccentricity error is determined by applying stepwise error corrections to the position of the optical head until the optical head detects the calibration band throughout the entire rotation of the optical medium. The time needed to determine the error correction phase and amplitude may be reduced by estimating the phase and amplitude on first detection of the calibration band based on the size of the steps taken by the optical head and the amount of rotation covered by the calibration band on initial detection. As an alternative, the eccentricity error may be estimated by determining optical head movement that follows the calibration band through out the entire rotation and mimicking that movement as the corrective movement for writing information aligned with the calibration band. The calibration band in this alternative embodiment could, for instance, be made up of stamped grooves or data.

Figure 4:
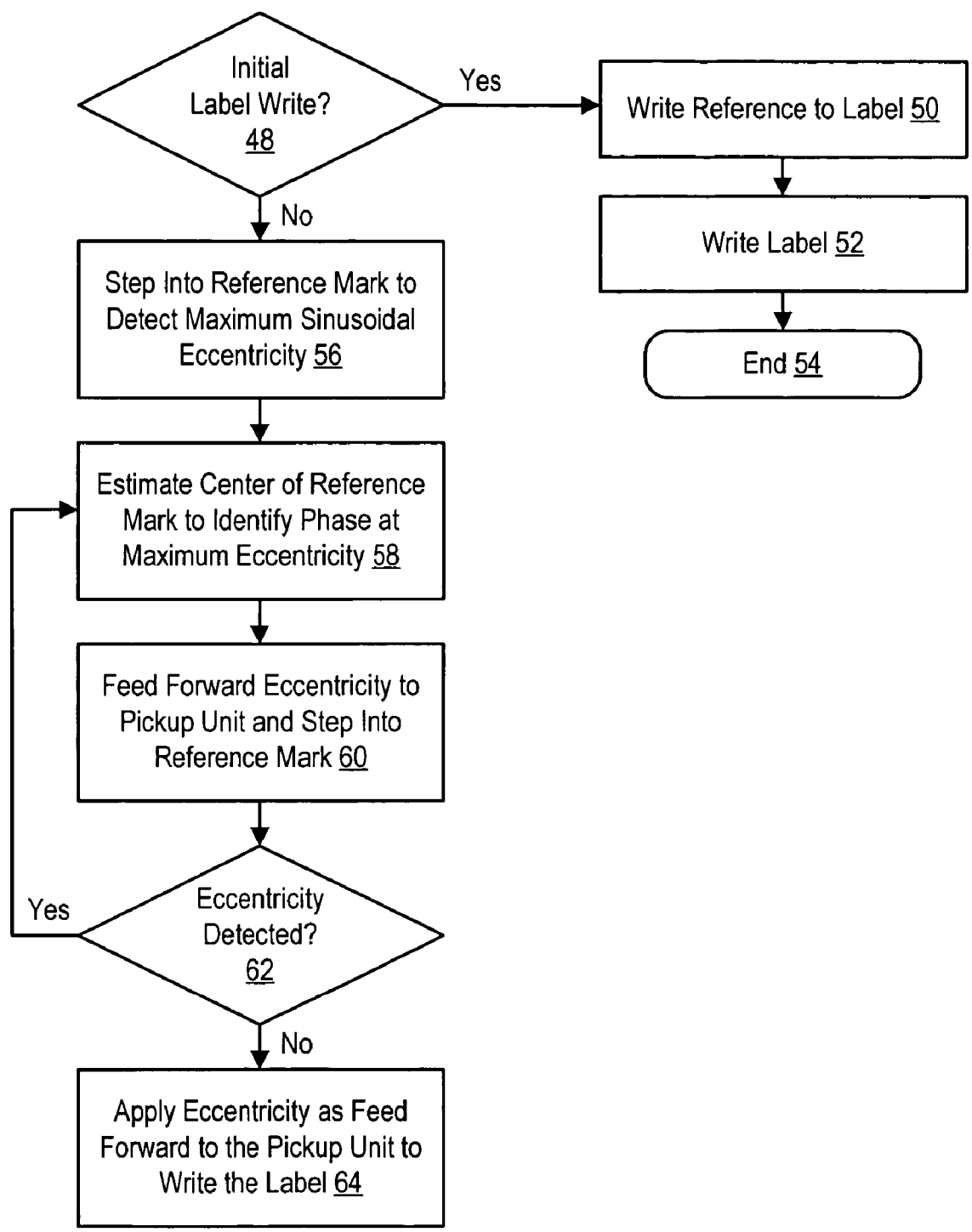
FIG. 4 a flow diagram of a process for aligning label writes by determining eccentricity error.

Referring now to FIG. 4 a flow diagram depicts a process for aligning label writes by determining eccentricity error. The process begins at step 48 with a determination of whether the label write is an initial write by attempting to detect a calibration band. If no calibration band is detected, the process continues to step 50 at which a reference calibration band is written with the optical head in a neutral position. At step 52, the label is written with the optical head in the neutral position to align with the calibration band and the process ends at step 54. Subsequent label writes to the same optical medium will align with the initial label write as long as the subsequent label writes align with the written calibration band. In one embodiment of the present invention, a calibration band is printed on the optical medium during manufacture at standardized location, such as a in compliance with the Blu-ray Disc high definition DVD standard. A pre-printed calibration band will be detected at step 48 and interpreted to mean the label write is not an initial write, even if no other label writes have been performed, so that all label writes will align with the pre-printed calibration band.

If a calibration band is detected at step 48, the label write is determined to not be an initial label write so the process continues to step 56 to determine an eccentricity error correction that will align the current label write with the detected calibration band. At step 56, the optical pickup unit is stepped from a position outside of the calibration band in towards the calibration band to the point of initial detection of the calibration band, which is determined to be the maximum amplitude of the sinusoidal eccentricity error. At step 58, the center of the calibration band reference mark is estimated to determine the phase of the maximum eccentricity error. At step 60, the phase of the eccentricity error and an estimate of the amplitude are fed forward to the optical pickup unit and the optical pickup unit is again stepped in towards the calibration band until detection of the calibration band. The estimate of the amplitude is based on the amount of rotation of the optical medium during which the calibration band is detected by the optical pickup unit. If, at step 62, the calibration band is detected during the complete rotation of the optical medium, the feed forward eccentricity error correction has aligned the optical head with the calibration band and the process continues to step 64 for writing of the label information with the application of the error correction amplitude and phase so that the label information aligns with the calibration band. If eccentricity error is detected at step 62, the process returns to step 58 for another iteration to attempt to determine a phase and error that, when fed forward as an error correction to the optical head position, will align the optical head with the calibration band.

Although the present invention has been described in detail, it should be understood that various changes, substitutions and alterations can be made hereto without departing from the spirit and scope of the invention as defined by the appended claims.

What is claimed is:

1. A method for writing labels to an optical medium, the method comprising:
    locating a reference mark on the optical medium, the reference mark having an eccentricity error relative to rotation of the optical medium;
    determining an amplitude for the eccentricity error of the reference mark;
    determining a phase for the eccentricity error of the reference mark;
    feeding forward the eccentricity error amplitude and phase to an optical pick-up unit; and
    applying the amplitude and phase for the eccentricity error of the reference mark at the optical pick-up unit to write a label on the optical medium in alignment with the reference mark.

2. The method of claim 1 further comprising:
    detecting a lack of a reference mark on the optical medium;
    writing a reference mark; and
    writing subsequent labels to the optical medium to align with the reference mark.

3. The method of claim 1 wherein the reference mark comprises a calibration band having a predetermined reflectivity and width.

4. The method of claim 3 further comprising printing the calibration band at manufacture of the optical medium.

5. The method of claim 3 wherein determining an amplitude for the eccentricity error further comprises:
    stepping the optical pickup unit towards the calibration band; and
    determining the maximum eccentricity amplitude at the first detection of the calibration band by the optical pickup unit.

6. The method of claim 3 wherein determining the phase for the eccentricity error further comprises:
    determining a location of the center of the calibration band;
    applying the amplitude and phase to the optical pickup unit; and
    repeating the stepping of the optical pickup unit to determine if the amplitude and phase align the optical pickup unit with the calibration band.

7. The method of claim 1 wherein applying the amplitude and phase further comprises estimating the eccentricity error from the step size of the optical pickup unit and the change in the amount of rotation of the optical medium where the reference mark is detected.

8. The method of claim 1 wherein the reference mark has width of at least approximately the greatest expected eccentricity error.

9. A system for writing labels to an optical medium, the system comprising:
    an optical head having a laser and an optical pickup unit, the laser operable to illuminate an optical medium label surface, the optical pickup unit operable detect the reflectivity of the illumination from the label surface;
    an optical head position controller interfaced with the optical head and operable to move the optical head in relation to the rotation of an optical medium; and
    a label alignment module interfaced with the optical head and the optical head position controller, the label alignment module operable to illuminate the label surface with the laser, to detect a reference mark with the optical pickup unit, and to generate an eccentricity correction for application by the optical head that aligns the optical head with the reference mark during writes by illumination of the laser to the label surface.

10. The system of claim 9 wherein the label alignment module is further operable to detect a lack of the reference mark and to write a reference mark for alignment of subsequent label writes to the label surface.

11. The system of claim 9 further comprising an optical medium proximate the optical head, the optical medium having a calibration band reference mark having a predetermined reflectivity detectable by the optical pickup unit.

12. The system of claim 11 wherein the optical medium has a manufacturing eccentricity constraint, the calibration band having a width substantially equal to the eccentricity constraint.

13. The system of claim 12 wherein the calibration band is created at manufacture of the optical medium.

14. The system of claim 12 wherein the optical medium has a spindle opening and the calibration band is located proximate the spindle opening.

15. The system of claim 9 wherein the eccentricity correction comprises an amplitude and phase correction for the optical head position controller to apply to the optical head through each rotation of the optical medium.

16. A information handling system comprising:
  processing components operable to generate label information for writing to an optical medium label surface;
  an optical drive interfaced with the processing components, the optical drive operable to rotate an optical medium about a spindle, the optical drive having a laser operable to write the label information to the label surface and an optical pickup unit operable to read illumination reflecting from the label surface; and
  a label alignment module associated with the optical drive and interfaced with the optical pickup unit, the label alignment module operable to analyze the eccentricity error associated with rotation of a calibration band on the label surface relative to the optical pickup unit and to provide the eccentricity error to the optical drive to align a write of the label information onto the label surface with the calibration band.

17. The information handling system of claim 16 wherein the eccentricity error comprises an amplitude and a phase.

18. The information handling system of claim 17 wherein the label alignment module analyzes the amplitude by stepping the optical pickup unit towards the calibration band and determining the amplitude at the first detection of the calibration band.

19. The information handling system of claim 16 wherein the optical medium comprises a CD.

20. The information handling system of claim 16 wherein the optical medium comprises a high definition DVD.

21. The information handling system of claim 16 wherein the optical medium comprises a DVD.

* * * * *